(12) United States Patent
Oka

(10) Patent No.: US 11,506,269 B2
(45) Date of Patent: Nov. 22, 2022

(54) BALL SCREW

(71) Applicant: NSK LTD., Tokyo (JP)

(72) Inventor: Keitaro Oka, Fujisawa (JP)

(73) Assignee: NSK LTD., Tokyo (JP)

( * ) Notice: Subject to any disclaimer, the term of this patent is extended or adjusted under 35 U.S.C. 154(b) by 21 days.

(21) Appl. No.: 16/349,371

(22) PCT Filed: Nov. 10, 2017

(86) PCT No.: PCT/JP2017/040531
§ 371 (c)(1),
(2) Date: May 13, 2019

(87) PCT Pub. No.: WO2018/088506
PCT Pub. Date: May 17, 2018

(65) Prior Publication Data
US 2020/0191247 A1 Jun. 18, 2020

(30) Foreign Application Priority Data

Nov. 14, 2016 (JP) .............................. JP2016-221428

(51) Int. Cl.
*F16H 25/22* (2006.01)
*F16H 25/24* (2006.01)
*F16C 31/04* (2006.01)

(52) U.S. Cl.
CPC ......... *F16H 25/2223* (2013.01); *F16H 25/24* (2013.01); *F16C 31/04* (2013.01)

(58) Field of Classification Search
CPC ............. F16H 25/2219; F16H 25/2228; F16H 25/2223; F16H 25/2214; F16H 25/24
See application file for complete search history.

(56) References Cited

U.S. PATENT DOCUMENTS 6,722,223 B2 *  4/2004  Kanda ................. F16H 25/2214
                                                74/424.82
6,993,992 B2 *  2/2006  Kanda ................. F16H 25/2214
                                                74/424.82

(Continued)

FOREIGN PATENT DOCUMENTS

CN        1549909 A    11/2004
JP        5-10412 A     1/1993

(Continued)

OTHER PUBLICATIONS

International Search Report dated Jan. 16, 2018 issued by the International Searching Authority in counterpart International Application No. PCT/JP2017/040531 (PCT/ISA/210).

(Continued)

*Primary Examiner* — Jake Cook
*Assistant Examiner* — Gregory Robert Weber
(74) *Attorney, Agent, or Firm* — Sughrue Mion, PLLC

(57) ABSTRACT

A ball screw includes a screw, a nut, a plurality of balls and a ball return path. A spiral screw groove is formed on an outer peripheral surface of the screw shaft. The nut is disposed around the screw shaft. A spiral screw groove is formed on an inner peripheral surface of the nut. The balls are housed in rolling paths formed by the two screw grooves facing each other. The ball return path circulates the balls in no more than one turn of the rolling paths. A length of the ball return path between scoop-up points where the balls are scooped up from the screw groove of the screw shaft is set to a value which is from −0.1 to +0.3 times of a diameter of the balls with respect to an integer value of a number of the balls filled between the scoop-up points.

2 Claims, 7 Drawing Sheets

(56) References Cited

U.S. PATENT DOCUMENTS

| | | | |
|---|---|---|---|
| 7,305,902 B2 * | 12/2007 | Inoue | F16H 25/2233 74/424.85 |
| 8,800,129 B2 * | 8/2014 | Osterlanger | F16H 25/2223 29/558 |
| 9,003,911 B2 * | 4/2015 | Miyazaki | F16H 25/2214 74/424.87 |
| 9,062,748 B1 * | 6/2015 | Guglietti | F16H 25/2223 |
| 2004/0237685 A1 | 12/2004 | Inoue et al. | |
| 2005/0016308 A1 * | 1/2005 | Hayashi | F16H 25/2214 74/424.86 |
| 2007/0006676 A1 | 1/2007 | Mizuhara et al. | |
| 2013/0220047 A1 * | 8/2013 | Yokoyama | F16H 25/2214 74/424.87 |
| 2016/0273633 A1 * | 9/2016 | Heck | F16H 25/2223 |

FOREIGN PATENT DOCUMENTS

| | | |
|---|---|---|
| JP | 2002-61731 A | 2/2002 |
| JP | 2003-184985 A | 7/2003 |
| JP | 2003-307623 A | 10/2003 |
| JP | 2004-36789 A | 2/2004 |
| JP | 2004-108395 A | 4/2004 |
| JP | 2004-353835 A | 12/2004 |
| JP | 2007263192 A | 10/2007 |
| JP | 4462458 B2 | 5/2010 |
| JP | 2012-47333 A | 3/2012 |

OTHER PUBLICATIONS

International Written Opinion dated Jan. 16, 2018 issued by the International Searching Authority in counterpart International Application No. PCT/JP2017/040531 (PCT/ISA/237).

Communication dated Oct. 18, 2019, issued by the European Patent Office in counterpart European Application No. 17868826.3.

Communication dated Aug. 2, 2021 issued by the State Intellectual Property Office of P.R. China in English counterpart Chinese Application No. 201780070339.0.

Communication dated Apr. 12, 2021, issued by the Korean Intellectual Property Office in Korean Application No. 10-2019-7013656.

Communication dated Jan. 4, 2022 issued by the State Intellectual Property Office of the P.R.China in application No. 201780070339.0.

Communication dated Mar. 29, 2022 issued by the Japanese Patent Office in application No. 2018-550273.

* cited by examiner

FIG. 12A
FIG. 12B
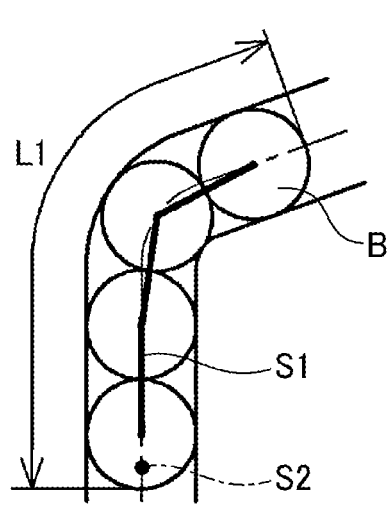
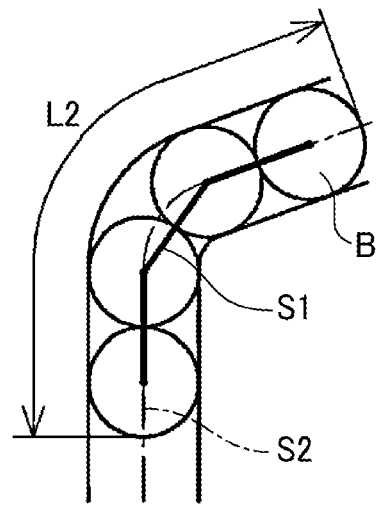

BALL SCREW

TECHNICAL FIELD

The present invention relates to a ball screw. More specifically, the present invention relates to an internal circulation type ball screw in which a ball return path disposed inside a nut returns a plurality of balls which circulate through rolling paths formed between a screw shaft and the nut.

BACKGROUND ART

Conventionally, an internal deflector type ball screw has an advantage of being the most compact among all types of ball screws. However, in some cases, a spike-like torque waveform appears in a low-speed range of the internal deflector type ball screw, so that operating characteristics of the internal deflector type ball screw in the low-speed range are worse than operating characteristics of other types of ball screws. When such an internal deflector type ball screw device is used in a feeding system of a machine tool, unevenness of feeding speed may occur due to the spike-like torque waveform, and a striped pattern may be formed on a processing surface, or positioning accuracy may be lowered.

Patent Literature 1 discloses a ball screw device which includes: a screw shaft that is disposed and rotates in a horizontal state; a nut externally fitted to the screw shaft; a plurality of balls that are rollably filled in a track formed by ball rolling grooves of the screw shaft and the nut; and a plurality of circulation internal deflectors that are provided in the nut and are provided with ball return grooves. The plurality of circulation internal deflectors are arranged in a row in an axial direction of the nut, while phases of the circulation internal deflectors are substantially upward, so that a gap is always formed in the ball return groove, so as to prevent clogging of the balls, prevent fluctuation in an operating torque of a ball passing period, and prevent problems caused by the fluctuation of the operating torque.

Patent Literature 2 discloses a ball screw, in which elastic bodies are interposed between balls, and in which a spring constant of the elastic bodies in a ball entering-exiting direction, which activates between a ball located at one end and a ball located at the other end of a circulation portion, is defined, so as to absorb fluctuation of entering and exiting of the balls in the circulation portion.

CITATION LIST

Patent Literature

PTL 1: JP-A-2012-47333
PTL 2: JP-A-2004-108395

SUMMARY OF INVENTION

Technical Problem

When spheres are arranged and moved in a curved path formed by a groove, a cylinder, or the like, a total length of a sphere row changes depending on positions of the spheres in the curved path. For example, when spheres B are filled in a curved path as shown in FIG. 12, since positions of the spheres B are different in FIG. 12A and FIG. 12B, total lengths of the spheres B are slightly different. This is because that a line S1 connecting centers of the spheres B is deviated from a center line S2 of the groove and forms a shortcut, and a shortcut amount thereof changes depending on the positions of the spheres B. That is, total lengths L1 and L2 expand and contract when the sphere row passes through the groove as shown in FIG. 12.

If an infinitely continuous sphere row passes through the curved path, even when the expansion and contraction occur, a sphere B cannot be extended due to the spheres B on the front and the rear, so the sphere B is elastically deformed to counteract the extension. As a result, since the spheres B are pressed and hit one another at a timing of the extension, the sphere row cannot smoothly pass through the curved path. However, since an amount of expansion and contraction changes depending on a curvature radius of the curved path or a length of the curve, the spheres B can smoothly pass through if a curve shape is fixed to reduce the amount of expansion and contraction.

When the sphere row expands and contracts, at an entrance and an exit of the curved path, an amount of the spheres B which enters the entrance and an amount of the spheres B which exits from the exit are not the same, but differ depending on the expansion and contraction. For this reason, this phenomenon may be referred to as an entering-exiting fluctuation, and the amount of expansion and contraction may be referred to as an entering-exiting fluctuation amount.

The internal deflector type ball screw has a structure in which a circulation path having a complicated three-dimensional curve shape is provided inside a circulation internal deflector, and in which a steel ball row passes therethrough. As a result, there is a problem that steel balls do not smoothly circulate in the circulation path due to the entering-exiting fluctuation.

According to the ball screw device described in Patent Literature 1, a hole or groove is necessarily provided in the nut so as to fit the circulation internal deflector, and thus there is a production problem that the hole or groove is easily deformed during heat treatment of the nut. Further, since balls in the circulation internal deflector cannot bear a load, a load balance among the respective balls is deteriorated, so a service life of the ball screw device may be reduced.

In the ball screw described in Patent Literature 2, it is necessary to reduce the number of balls since the elastic bodies are interposed between the balls. Therefore, a load capacity of the ball screw is reduced. Further, a ball filling operation at the time of assembly becomes complicated, and there is a concern about strength and wear resistance of the elastic bodies which are made of a high-flexibility material, and thus it is difficult to use the ball screw under high-speed rotation conditions.

The present invention is made in view of the above-described problems, and an object of the present invention is to provide a ball screw which can reduce entering-exiting fluctuation (operation torque fluctuation) when balls pass through a ball return path, and can improve operation characteristics at low speed.

Solution to Problem

The object of the present invention is achieved by the following configuration.

(1) A ball screw includes:
a screw shaft, a spiral screw groove being formed on an outer peripheral surface of the screw shaft;
a nut disposed around the screw shaft, a spiral screw groove being formed on an inner peripheral surface of the nut;

a plurality of balls that are housed in rolling paths formed by the two screw grooves facing each other; and a ball return path that circulates the plurality of balls in no more than one turn of the rolling paths, a length of the ball return path between scoop-up points where the balls are scooped up from the screw groove of the screw shaft is set to a value which is from −0.1 to +0.3 times of a diameter of the balls with respect to an integer value of a number of the balls filled between the scoop-up points.

(2) In the ball screw according to (1), a maximum inclination angle of the ball return path with respect to a surface perpendicular to an axial direction of the screw shaft is from 20 to 40 degrees when a lead angle of the two screw grooves is less than 5 degrees, the maximum inclination angle of the ball return path is from 20 to 60 degrees when the lead angle of the two screw grooves is no less than 5 degrees and no more than 7 degrees, and the maximum inclination angle of the ball return path is from 40 to 60 degrees when the lead angle of the two screw grooves is more than 7 degrees.

(3) In The ball screw according to (1) or (2), the ball return path is configured by a circulation internal deflector.

Advantageous Effects of Invention

The ball screw of the present invention includes: a screw shaft, a spiral screw groove being formed on an outer peripheral surface of the screw shaft; a nut disposed around the screw shaft, a spiral screw groove being formed on an inner peripheral surface of the nut; a plurality of balls that are housed in rolling paths formed by the two screw grooves facing each other; and a ball return path that circulates the plurality of balls in no more than one turn of the rolling paths. A length of the ball return path between scoop-up points where the balls are scooped up from the screw groove of the screw shaft, is set to a value which is from −0.1 to +0.3 times of a diameter of the balls with respect to an integer value of a number of the balls filled between the scoop-up points, so that entering-exiting fluctuation (operation torque fluctuation) can be reduced when the balls pass through the ball return path, and operation characteristics at low speed are thus improved.

BRIEF DESCRIPTION OF DRAWINGS

FIG. 12A and FIG. 12B show a change in a total length of a sphere row with respect to positions of spheres.

DESCRIPTION OF EMBODIMENTS

An embodiment of a ball screw according to the present invention will be described in detail below with reference to the drawings.

Figure 1:
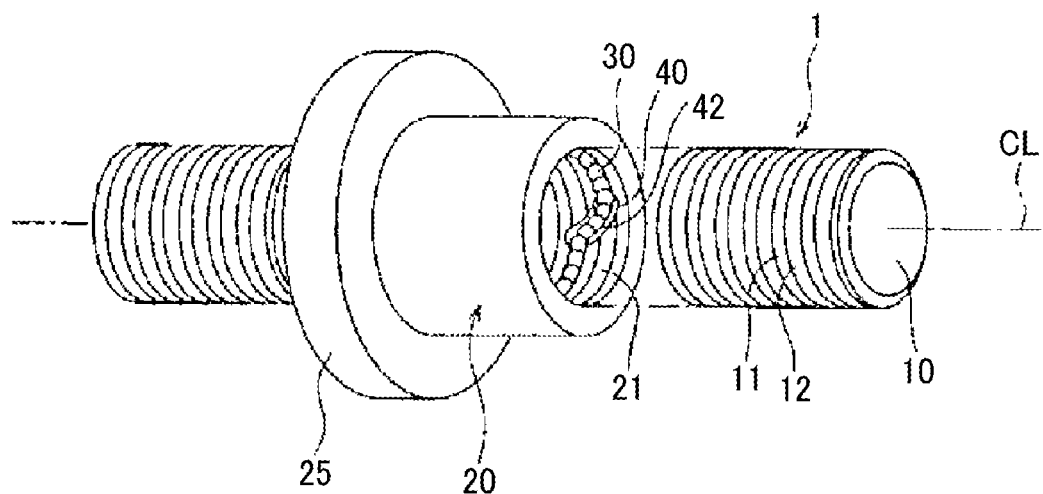
FIG. 1 is a perspective view of a ball screw according to the present invention.
Figure 2:
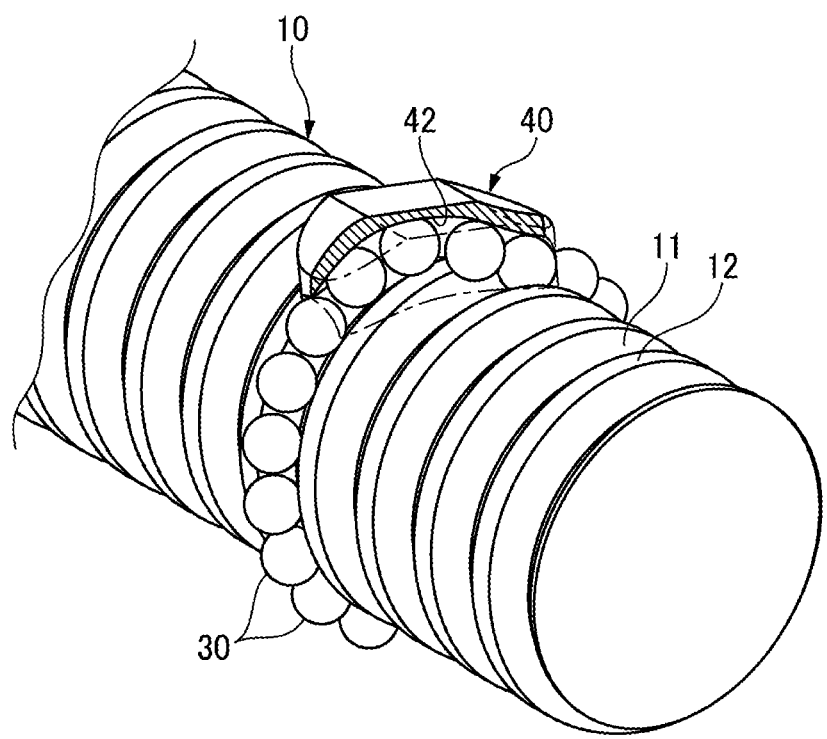
FIG. 2 is a perspective view showing a steel ball row passing through a circulation path, together with a screw shaft and a circulation internal deflector.
Figure 3:
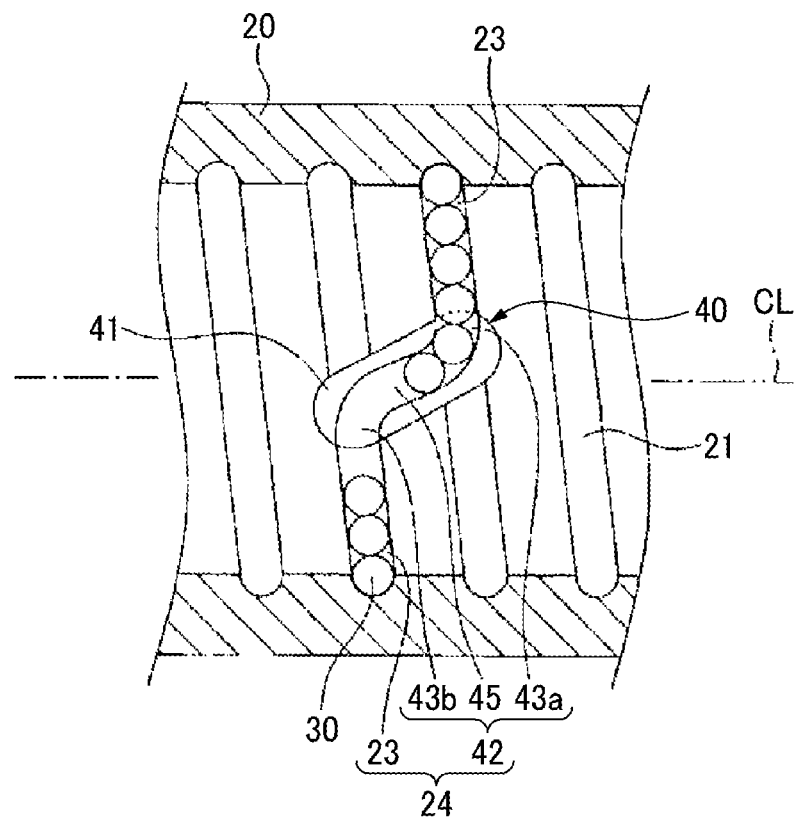
FIG. 3 is a cross-sectional view of a main part of the ball screw shown in FIG. 1.

FIG. 1 is a perspective view of the ball screw according to the present invention. FIG. 2 is a perspective view showing a steel ball row passing through a circulation path, together with a screw shaft and a circulation internal deflector. FIG. 3 is a cross-sectional view of a main part of the ball screw shown in FIG. 1.

An internal circulation type ball screw 1 shown in FIG. 1 is used for conveyance or precision positioning of a machine tool, an industrial machine, or the like. Particularly, the ball screw 1 is suitably applied to a high-precision machine tool used for high-precision machining such as mold machining.

The ball screw 1 includes a screw shaft 10, a nut 20, a plurality of balls 30, and a plurality of circulation internal deflectors 40. The screw shaft 10 is formed in a cylindrical shape centered on a central axis CL. A spiral first screw groove 11 having a predetermined lead is formed on an outer peripheral surface of the screw shaft 10.

The nut 20 has a substantially cylindrical shape, and an inner diameter of the nut 20 is larger than an outer diameter of the screw shaft 10. The nut 20 is externally fitted to the screw shaft 10 with a predetermined gap therebetween. A flange 25 that couples with a guide target is provided at one end portion of the nut 20. An inner peripheral surface of the nut 20 has a lead which is equal to the lead of the first screw groove 11 of the screw shaft 10, and is provided with a second screw groove 21 which faces the first screw groove 11. Rolling paths 23 having a substantially circular cross section are formed by the first screw groove 11 of the screw shaft 10 and the second screw groove 21 of the nut 20. The plurality of balls 30 are rollably filled in the rolling paths 23.

The plurality of circulation internal deflectors 40, that respectively return the balls 30 to rolling paths 23 before, are mounted on the inner peripheral surface of the nut 20. A ball return path 42, which connects one end of a rolling path 23 to another end of another rolling path 23 which is provided one turn before the rolling path 23, is formed in each of the circulation internal deflectors 40. The balls 30 rolling from the rolling paths 23 toward the respective circulation internal deflectors 40 are scooped up in a radial direction of the screw shaft 10 by the ball return paths 42, move over screw threads 12 of the screw shaft 10, and return to the rolling paths 23 one turn before (one lead before). Thereby, the balls 30 can be circulated.

Substantially annular endless circulation paths 24 are respectively formed outside the screw shaft 10 by the ball return paths 42 and the rolling paths 23. Accordingly, the nut 20 can linearly move in an axial direction of the screw shaft 10 with respect to the screw shaft 10 due to an endless circulation of the plurality of balls 30 in the endless circulation path 24 in accordance with relative rotation of the screw shaft 10 with respect to the nut 20.

Next, each circulation internal deflector 40 will be described in detail with reference to FIGS. 4 and 5. The circulation internal deflector 40 is a member having a substantially oval shape in a top view, which is formed of, for example, sintered alloy. The substantially S-shaped ball return path 42 is formed on an inner surface of the circulation internal deflector 40. The ball return path 42 scoops up the balls 30 from the first screw groove 11 of the screw shaft 10 at a scoop-up point 43a at one end of the circulation internal deflector 40, moves the balls 30 over the screw thread 12 via an intermediate path 45, and returns the balls 30 to the first screw groove 11 one turn before at a scoop-up point 43b at the other end of the circulation internal deflector 40.

Here, the scoop-up points 43a, 43b are contact points between a trajectory T1 of the balls 30 on the screw shaft 10 (first screw groove 11) and a trajectory T2 of the balls 30 in the circulation internal deflector 40, that is, points where the balls 30 moving on the screw shaft 10 are separated from the trajectory T1.

An inclination angle formed by a surface S perpendicular to the central axis CL of the screw shaft 10 and the trajectory T2 of the balls 30 in the ball return path 42 becomes a maximum inclination angle α at an internal deflector center C on a route of the circulation internal deflector 40. An angle formed by the trajectory T1 of the balls 30 on the screw shaft 10 and the surface S perpendicular to the central axis CL of the screw shaft 10 is a lead angle β of the screw grooves 11 and 21.

As a result of intensive studies, the present inventor found that there is a relationship between the number of balls filled in the ball return path 42, strictly, the number of balls filled between the scoop-up points 43a and 43b, and the entering-exiting fluctuation. In the following description, a length between the scoop-up points 43a and 43b of the ball return path 42 is expressed by the number of balls filled between the scoop-up points 43a and 43b, whereas a length which is less than one ball is converted with respect to a diameter of the balls 30 and is expressed as the number of balls filled between the scoop-up points 43a and 43b for the sake of convenience.

Figures 4A, 4B:
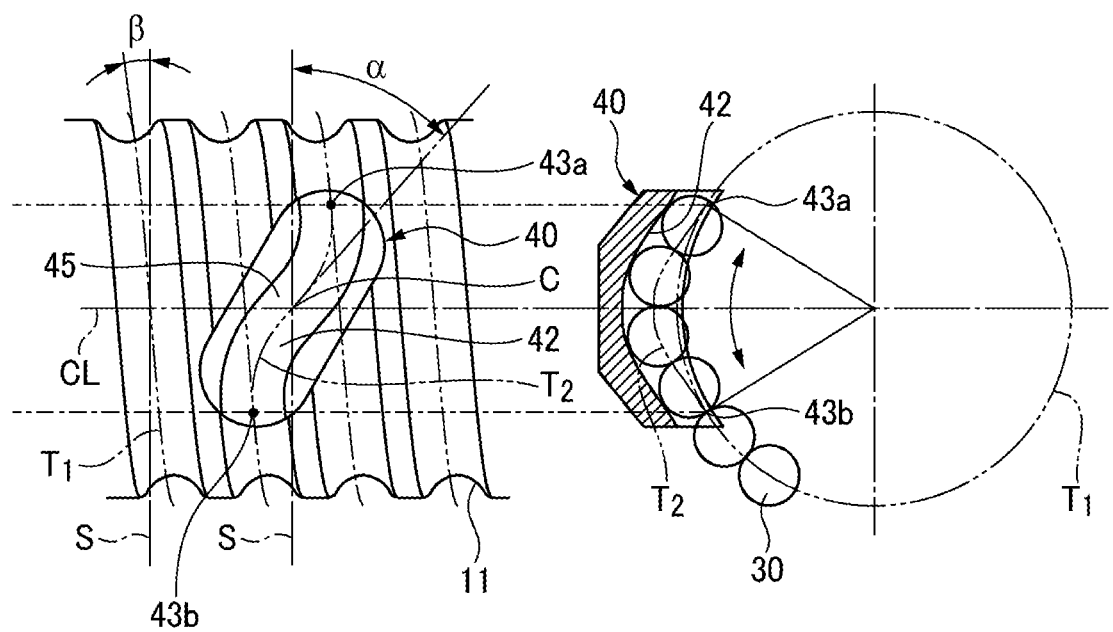
FIG. 4A is a schematic view showing a screw groove of the screw shaft and a ball return path of the circulation internal deflector.
FIG. 4B is a cross-sectional view of the ball return path filled with balls between scoop-up points.
Figures 5A, 5B:
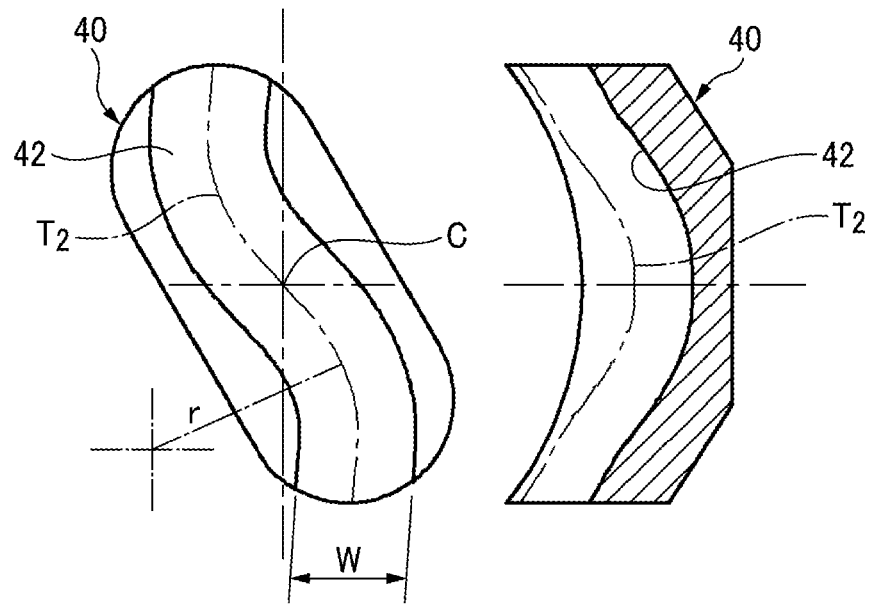
FIG. 5A is a top view showing a shape of the ball return path of the circulation internal deflector.
FIG. 5B is a cross-sectional view taken along a center line of the ball return path in FIG. 5A.

For example, FIG. 4B shows a case where the number of balls filled between the scoop-up points 43a and 43b is 4.1.

Figure 6:
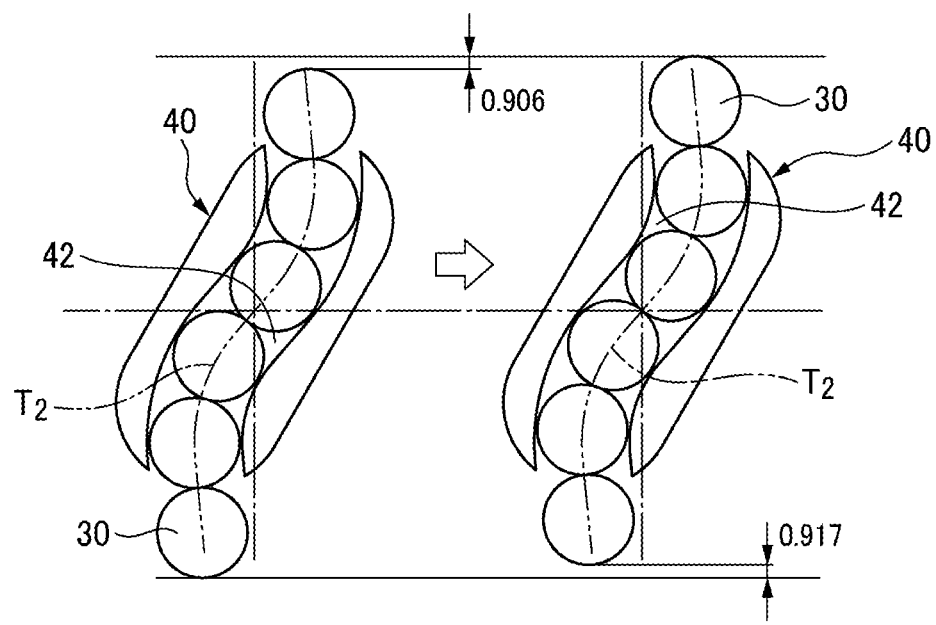
FIG. 6 is an explanatory view showing behavior of balls passing through the ball return path.

The entering-exiting fluctuation is a difference in moving amounts of the balls in the ball return path 42. In an example shown in FIG. 6, a lower ball 30 moved 0.917 mm toward an inside of the circulation internal deflector 40, whereas an upper ball 30 only moved 0.906 mm. The difference in the ball moving amounts causes unevenness in the circulation of the balls 30, which appears as torque fluctuation.

Figure 7A:
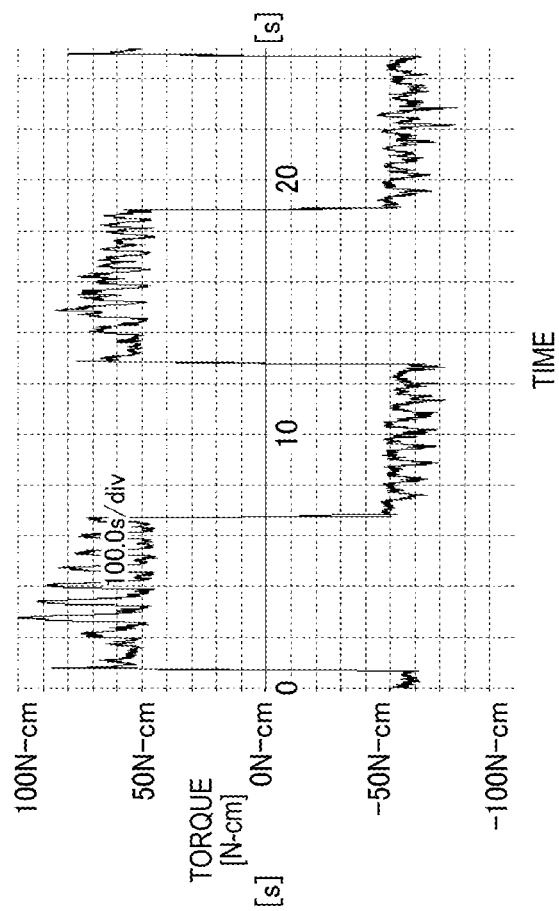
FIG. 7A is a graph showing a torque waveform of the ball screw according to the present invention which has small entering-exiting fluctuation.
Figure 7B:
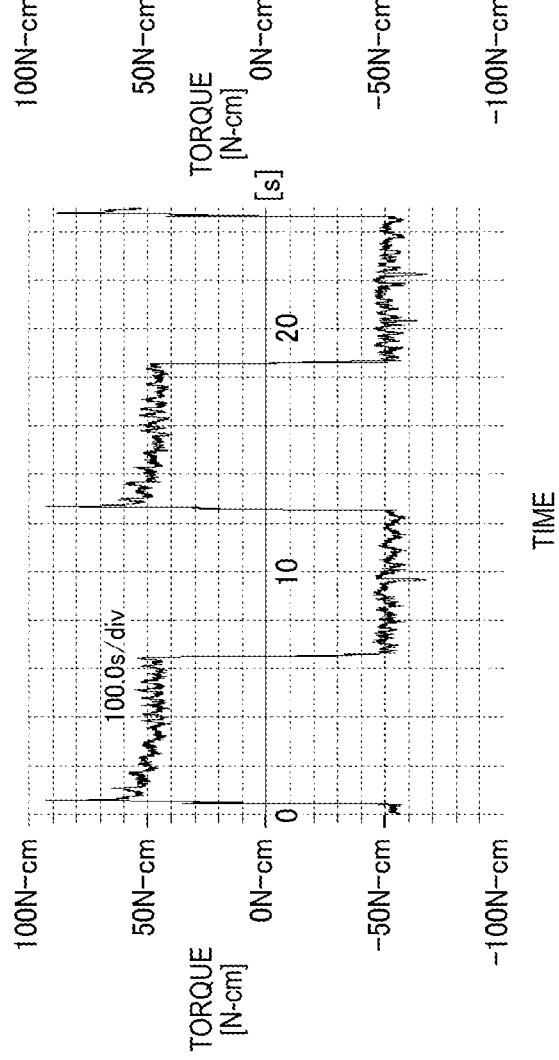
FIG. 7B is a graph showing a torque waveform of a conventional ball screw which has large entering-exiting fluctuation.

For example, as shown in FIG. 7A, in the circulation internal deflector 40 whose entering-exiting fluctuation difference is small (0.04 mm), fluctuation in a torque waveform decreased. On the other hand, as shown in FIG. 7B, in the circulation internal deflector 40 whose entering-exiting fluctuation difference is large (0.11 mm), fluctuation in the torque waveform increased.

Figure 8:
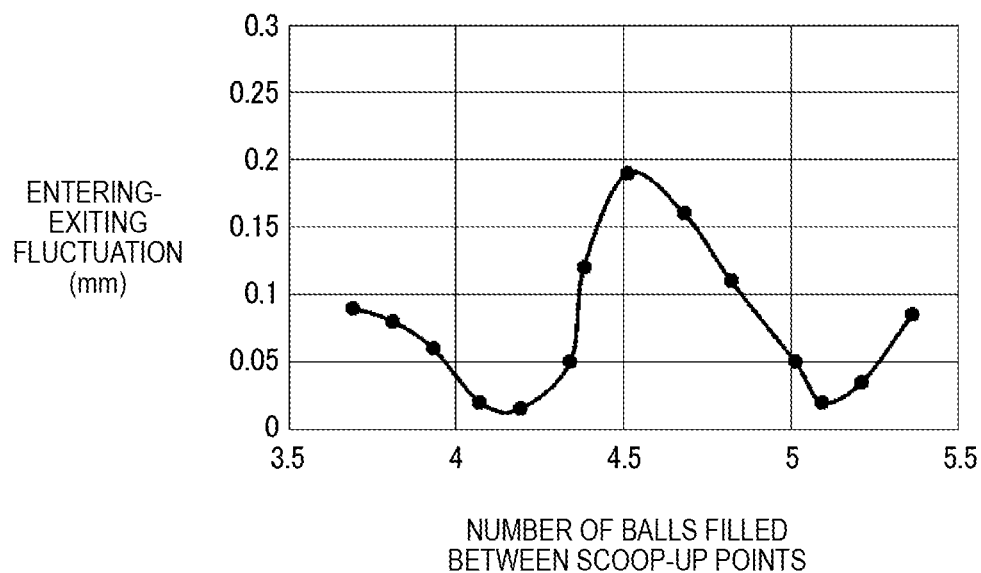
FIG. 8 is a graph showing a relationship between a number of balls filled between scoop-up points of the ball return path, and entering-exiting fluctuation.

FIG. 8 shows a result obtained by calculating the relationship between the number of balls filled between the scoop-up points 43a and 43b of the ball return path 42 and the entering-exiting fluctuation in an example when a shaft diameter of the screw shaft 10 was set to 50 mm, which shows that the entering-exiting fluctuation changed greatly depending on the number of balls filled between the scoop-up points 43a and 43b. In this case, it seems the entering-exiting fluctuation was minimized when the number of balls was around 4.2.

Therefore, the present inventor examined the number of balls filled between the scoop-up points 43a and 43b that minimizes the entering-exiting fluctuation via calculation with respect to various ball screws 1 in which the shaft diameter of the screw shaft 10 was from 20 to 63 mm, the lead of the screw grooves 11 and 21 was from 5 to 20 mm, and the ball diameter was from 1/8 to 3/8 in.

Figure 9:
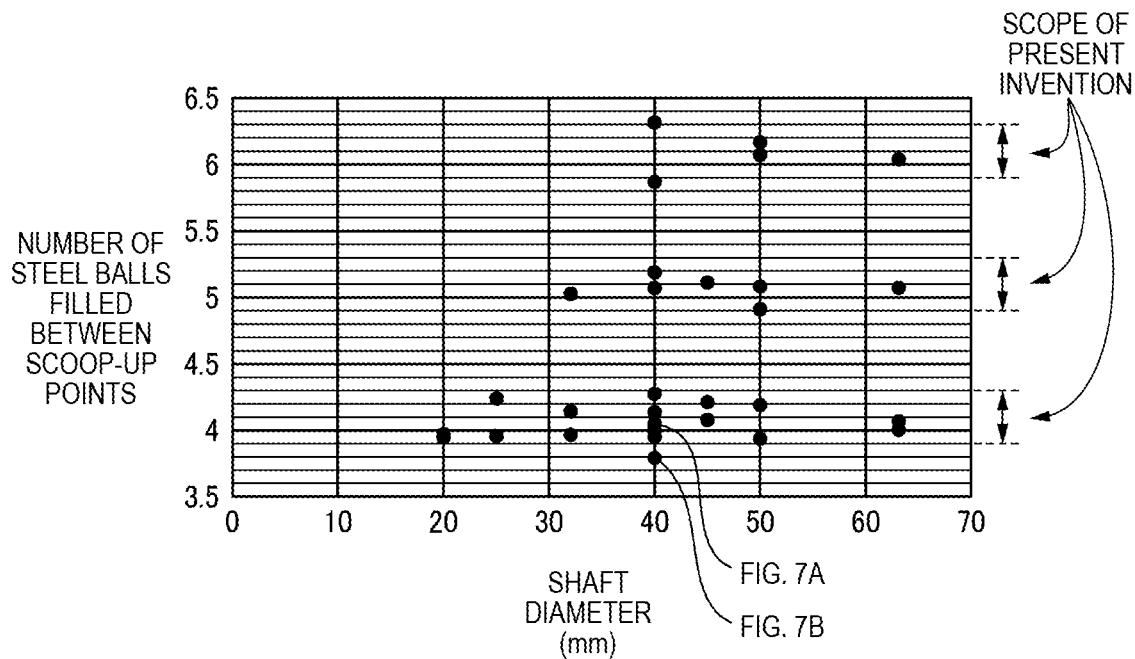
FIG. 9 is a graph showing a relationship between a shaft diameter of a screw shaft, and the number of balls filled between scoop-up points that minimizes entering-exiting fluctuation.

FIG. 9 is a graph showing a relationship between the shaft diameter of the screw shaft, and the number of balls filled between the scoop-up points that minimizes the entering-exiting fluctuation. As shown in FIGS. 8 and 9, it seems that, when the length of the ball return path 42 between the scoop-up points 43a and 43b was set to a value which is from −0.1 to +0.3 times of the diameter of the balls 30 with respect to an integer value of the number of balls filled between the scoop-up points 43a and 43b, the entering-exiting fluctuation decreased.

Accordingly, minimum values of the entering-exiting fluctuation, each of which was 0.05 mm or less, were obtained in each of the various ball screws 1.

Points FIG. 7A and FIG. 7B in FIG. 9 show the numbers of balls filled between the scoop-up points 43a and 43b corresponding to respective internal deflector design values.

A relationship, that minimizes the entering-exiting fluctuation, between the lead angle β of the screw grooves 11 and 21 and the angle α of the ball return path 42 at the internal deflector center C on the route of the circulation internal deflector 40 (maximum inclination angle) was examined by calculation, in a condition where the shaft diameter of the screw shaft 10, the lead of the screw grooves 11 and 21 and the ball diameter were set to be the same as conditions in FIG. 9.

Figure 10:
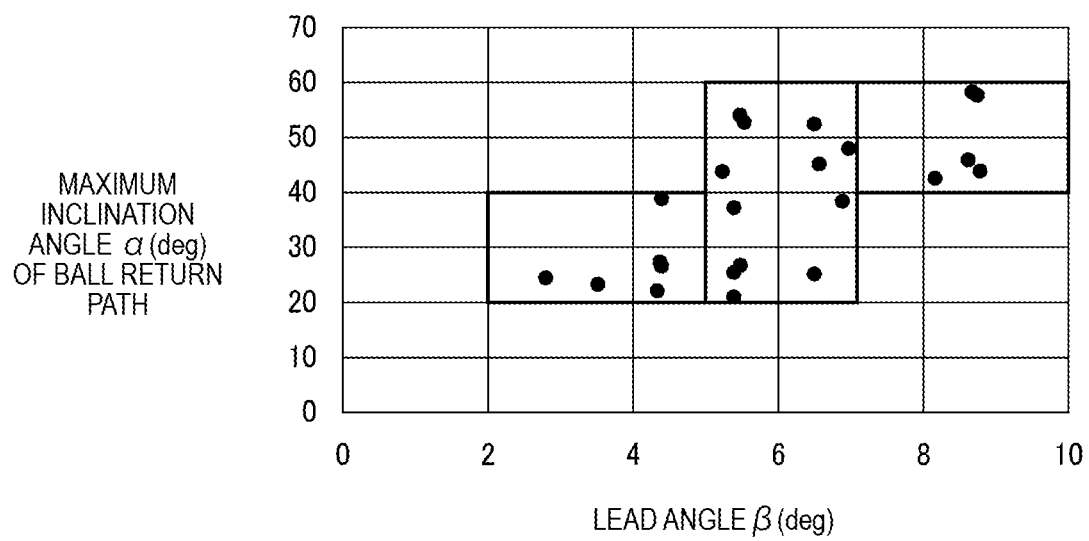
FIG. 10 is a graph showing a relationship, that minimizes entering-exiting fluctuation, between a lead angle of the screw groove and a maximum inclination angle of the ball return path.

As a result, as shown in FIG. 10, it seems that the entering-exiting fluctuation can be reduced by: when the lead angle β of the two screw grooves 11 and 21 is less than 5 degrees, setting the angle α at the internal deflector center C on the route of the circulation internal deflector 40 of the ball return path 42 to from 20 to 40 degrees, preferably from 20 to 30 degrees; when the lead angle β of the two screw grooves 11 and 21 is no less than 5 degrees and no more than 7 degrees, setting the angle α at the internal deflector center C on the route of the circulation internal deflector 40 of the ball return path 42 to from 20 to 60 degrees; when the lead angle β of the two screw grooves 11 and 21 is more than 7 degrees, setting the angle α at the internal deflector center C on the route of the ball return path 42 to from 40 to 60 degrees. That is, the angle α at the internal deflector center C on the route should be set within the above ranges according to the lead angle β of the two screw grooves 11 and 21.

Since the balls 30 are deviated from a center of the ball return path 42 when a width of the ball return path 42 is wider with respect to the balls 30 in the circulation internal deflector 40, a state of the balls 30 becomes unstable, and the trajectory T2 of the balls 30 in the circulation internal deflector 40 is also influenced. As shown in FIG. 5, in order to align the balls 30 near the center of the ball return path 42 as designed, a width W of the ball return path 42 is preferably no more than a value obtained by multiplying the diameter of the balls 30 by 1.07.

Figure 11:
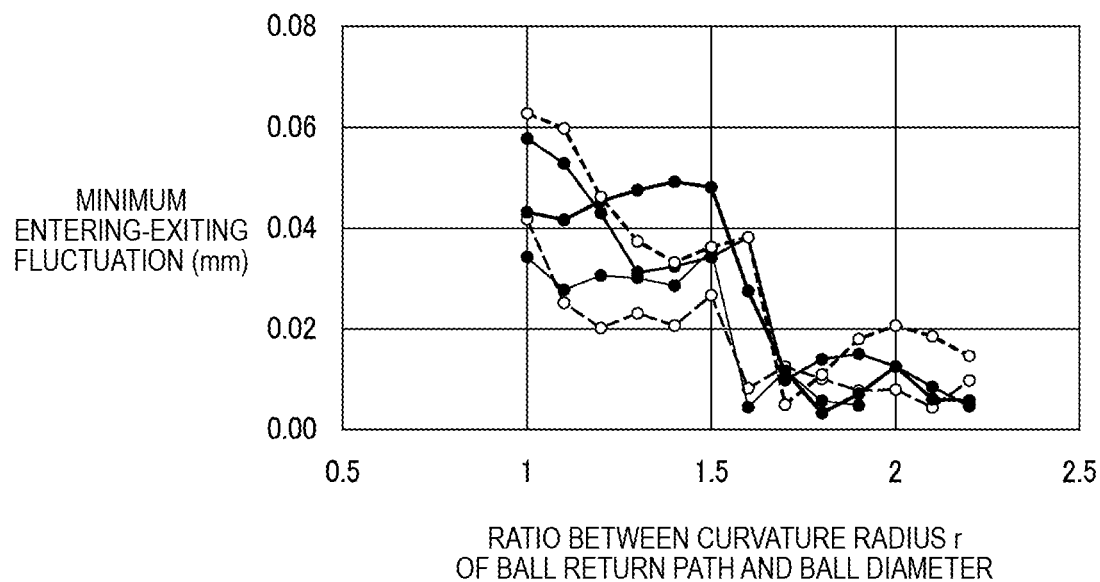
FIG. 11 is a graph showing a relationship between the ball return path/a diameter of a ball and a minimum amount of entering-exiting fluctuation.

Fluctuation of the trajectory T2 of the balls 30 in the circulation internal deflector 40 decreases when a curvature radius r of the ball return path 42 increases. Here, a minimized entering-exiting fluctuation was calculated in ball screws having various specifications (shaft diameter: 32 to 63 mm), in a case where ratios between the curvature radius r of the ball return path 42 and the diameter of the balls 30 varied between 1 and 2.2. As shown in FIG. 11, it seems that a small route fluctuation could be obtained as long as a ratio of the curvature radius r of the ball return path 42 to the diameter of the balls 30 was no less than 1.5. Therefore, a minimum value of the curvature radius r of the ball return path 42 is preferably no less than 1.5 times of the diameter of the balls 30, more preferably no less than 1.6 times of the diameter of the balls 30, and further more preferably no less than 1.7 times of the diameter of the balls 30.

As described above, the ball screw 1 of the present invention includes: the screw shaft 10, in which the first screw groove 11 is formed on the outer peripheral surface of the screw shaft 10; the nut 20 disposed around the screw shaft 10, in which the second screw groove 21 is formed on the inner peripheral surface of the nut 20; the plurality of balls 30 which are housed in the rolling paths 23 formed by the two screw grooves 11 and 21 facing each other; and the ball return paths 42 that circulate the plurality of balls 30 to the rolling paths no more than one turn. The length L of the ball return paths 42, between the scoop-up points 43$a$ and 43$b$ where the balls 30 are scooped up from the first screw groove 11 of the screw shaft 10, is set to the value which is from −0.1 to +0.3 times of the diameter of the balls 30 with respect to an integer value of the number of the balls filled between the scoop-up points 43$a$ and 43$b$, so that the entering-exiting fluctuation (operation torque fluctuation) can be reduced when the balls 30 pass through the ball return paths 42, and the operation characteristics at low speed are thus improved.

Accordingly, positioning accuracy and motion accuracy can be improved in a feeding device using the ball screw 1.

When the lead angle β of the two screw grooves 11 and 21 is less than 5 degrees, the angle α at the internal deflector center C on the route of the ball return paths 42 with respect to the surface S perpendicular to the axial direction of the screw shaft 10 is from 20 to 40 degrees, preferably from 20 to 30 degrees; when the lead angle β of the two screw grooves 11 and 21 is no less than 5 degrees and no more than 7 degrees, the angle α at the internal deflector center C on the routes of the ball return paths 42 is from 20 to 60 degrees; and when the lead angle β of the two screw grooves 11 and 21 is more than 7 degrees, the angle α at the internal deflector center C on the routes of the ball return paths 42 is from 40 to 60 degrees. Therefore, the entering-exiting fluctuation when the balls 30 pass through the ball return paths 42 can be further reduced, and the operation characteristics at low speed are thus improved.

Since the ball return paths 42 are formed by the circulation internal deflectors 40, the ball return paths 42 can be easily manufactured with high accuracy without complicated machining of the nut 20.

The present invention is not limited to the embodiment described above, and modifications, improvements, and the like can be made as appropriate.

The ball return paths 42 can be any form, as long as the balls 30 are circulated to the rolling paths 23 less than one turn. For example, although in the present embodiment the ball return paths 42 are formed by the circulation internal deflectors 40 disposed on the inner surface of the nut 20, the ball return paths may be formed integrally with the inner peripheral surface of the nut (see JP-A-2003-307623), without being limited to the circulation internal deflectors 40. In this case, since the ball return paths are integrated with the nut, the ball return paths and the screw groove of the nut are formed without level difference, and thus the balls 30 are not stuck by the level difference and a smooth operation can be realized.

The ball return paths may separate the balls from the outer peripheral surface of the screw shaft, and the balls 30 may be circulated only by the circulation internal deflectors (see JP-A-1993-10412). The ball return paths may be formed in a tunnel shape (see JP-B-4462458). The circulation internal deflectors may have a tongue portion that extends into the screw groove of the screw shaft.

This application is based on Japanese Patent Application No. 2016-221428, filed on Nov. 14, 2016, the contents of which are incorporated herein by reference.

REFERENCE SIGNS LIST

1. Ball Screw
10. Screw Shaft
11. First Screw Groove (Screw Groove)
20. Nut
21. Second Screw Groove (Screw Groove)
23. Rolling Path
30. Ball
40. Circulation Internal Deflector
42. Ball Return Path
43$a$, 43$b$. Scoop-up Points of Ball
L. Length of Ball Return Path
S. Surface Perpendicular to Axial Direction of Screw Shaft
α. Angle at Deflector Center on Route of Ball Return Path (Maximum Inclination Angle)
β. Lead Angle of Screw Groove

The invention claimed is:

1. A ball screw, comprising:
a screw shaft, wherein a first spiral screw groove is formed on an outer peripheral surface of the screw shaft;
a nut disposed around the screw shaft, wherein a second spiral screw groove is formed on an inner peripheral surface of the nut;
a plurality of balls that are housed in interconnected rolling paths formed by the first and second spiral screw grooves facing each other, each of the balls having a predetermined diameter; and
a ball return path that circulates the plurality of balls by returning the plurality of balls, rolled from one of the rolling paths to the other of the rolling paths, to the one of the rolling paths again,
wherein a length of the ball return path between scoop-up points where the balls are scooped up from the first spiral screw groove of the screw shaft satisfies the following formula:

$$(N-0.1)D \leq L \leq (N+0.3)D, \text{ where}$$

L is the length of the ball return path,
N is an integer value corresponding to a number of balls in the ball return path between the scoop-up points, and
D is the predetermined diameter; and wherein a minimum value of the curvature radius of the ball return path is no less than 1.5 times of the predetermined diameter, wherein a length from one side to the other side of the rolling path is less than one turn of the first spiral screw groove and the second spiral screw groove, and wherein a maximum inclination angle of the ball return path with respect to a surface perpendicular to an axial direction of the screw shaft is:

from 20 to 60 degrees when the lead angle of the first and second spiral screw grooves is no less than 5 degrees and no more than 7 degrees, and from 40 to 60 degrees when the lead angle of the first and second spiral screw grooves is more than 7 degrees.

2. The ball screw according to claim 1,
wherein the ball return path is configured by a circulation internal deflector.

* * * * *